United States Patent
Sato et al.

(10) Patent No.: US 10,391,395 B2
(45) Date of Patent: Aug. 27, 2019

(54) OPERATING DEVICE

(71) Applicant: ALPS ALPINE CO., LTD., Ota-ku, Tokyo (JP)

(72) Inventors: Kunio Sato, Tokyo (JP); Shun Miyazaki, Tokyo (JP); Yasuji Hagiwara, Tokyo (JP); Shoji Sakurai, Tokyo (JP); Keigo Wakana, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 264 days.

(21) Appl. No.: 15/467,095

(22) Filed: Mar. 23, 2017

(65) Prior Publication Data
US 2017/0203208 A1    Jul. 20, 2017

Related U.S. Application Data

(63) Continuation of application No. PCT/JP2015/073351, filed on Aug. 20, 2015.

(30) Foreign Application Priority Data

Sep. 30, 2014 (JP) ................. 2014-201224

(51) Int. Cl.
*A63F 13/245* (2014.01)
*A63F 13/285* (2014.01)
(Continued)

(52) U.S. Cl.
CPC .......... *A63F 13/285* (2014.09); *A63F 13/245* (2014.09); *A63F 13/837* (2014.09);
(Continued)

(58) Field of Classification Search
USPC .............................................. 463/2
See application file for complete search history.

(56) References Cited

U.S. PATENT DOCUMENTS

2004/0254048 A1* 12/2004 Yone .................... B60K 26/021
477/108
2015/0135108 A1* 5/2015 Pope .................. G06K 9/00006
715/767
2016/0084605 A1   3/2016 Monti

FOREIGN PATENT DOCUMENTS

JP   7-112074   5/1995
JP   7-219704   8/1995
(Continued)

OTHER PUBLICATIONS

International Search Report for PCT/JP2015/073351 dated Nov. 17, 2015.

*Primary Examiner* — Pierre E Elisca
(74) *Attorney, Agent, or Firm* — Hunton Andrews Kurth LLP (57) ABSTRACT

An operating device includes a moving member that reciprocates, a motor that applies a force for moving forward and a force for moving rearward to the moving member, a position sensing unit that detects a position to which the moving member is moved, and a control device that varies a load applied to the motor in accordance with an output signal from the position sensing unit. According to the operating device, a reaction force that acts on a finger or the like can be changed in accordance with the position of the moving member that is operated by using a hand or the finger.

6 Claims, 10 Drawing Sheets

(51) Int. Cl.
 *G05G 1/02* (2006.01)
 *G05G 5/03* (2008.04)
 *G05G 25/00* (2006.01)
 *A63F 13/837* (2014.01)
(52) U.S. Cl.
 CPC .................. *G05G 1/02* (2013.01); *G05G 5/03*
 (2013.01); *G05G 25/00* (2013.01)

(56) References Cited

FOREIGN PATENT DOCUMENTS

| | | |
|---|---|---|
| JP | 8-89661 | 4/1996 |
| JP | 2003-25870 | 1/2003 |
| JP | 2003-31995 | 1/2003 |
| JP | 2008-276675 | 11/2008 |
| JP | 2009-25047 | 2/2009 |
| JP | 2011-179526 | 9/2011 |

\* cited by examiner

OPERATING DEVICE

CLAIM OF PRIORITY

This application is a Continuation of International Application No. PCT/JP2015/073351 filed on Aug. 20, 2015, which claims benefit of Japanese Patent Application No. 2014-201224 filed on Sep. 30, 2014. The entire contents of each application is incorporated herein by reference.

BACKGROUND OF THE INVENTION

1. Field of the Invention

The present invention relates to an operating device capable of controlling a reaction force that acts on an operating portion when the operating portion is operated.

2. Description of the Related Art

An operating device on which a reaction force acts when an operating portion is operated has been widely used as a controller for a video game apparatus.

Japanese Unexamined Patent Application Publication No. 7-24147 describes a gun unit used in a shooting video game apparatus as a controller for a video game apparatus. In the gun unit, a gun main body is attached to an upper portion of a support portion, and the gun main body is provided with a vibration mechanism that causes the entire gun main body to perform reciprocating vibration in a front-rear direction. When an operation of pulling a trigger, which is included in the gun main body, is performed, the vibration mechanism is activated so as to cause the entire gun main body to vibrate in the front-rear direction, and recoil is transferred to a hand of an operator who is playing a video game.

The gun unit described in Japanese Unexamined Patent Application Publication No. 7-24147 causes the entire gun main body to perform a reciprocating motion in the front-rear direction and is not configured to enable a finger that operates the trigger to feel recoil, and thus, an operator cannot perform a realistic game operation. In addition, the reaction force that acts on the gun main body is limited to a vibration force generated as a result of rotation of a motor, and thus, various operation reaction forces cannot act on the operator.

SUMMARY OF THE INVENTION

The present invention provides an operating device capable of causing a reaction force to act on a finger that is operating an operating portion and applying various reaction forces to the finger in accordance with a position where the operating portion is operated.

An operating device according to an aspect of the present invention includes a moving member that reciprocates, an operating portion that applies a moving force to the moving member, a motor that applies a force for moving forward and a force for moving rearward to the moving member, a position sensing unit that detects a position to which the moving member is moved, and a control device that changes a rotational operation of the motor in accordance with an output signal from the position sensing unit.

According to the operating device of the present invention, since a reaction force directly acts on the moving member, a hand or a finger that is operating the moving member may directly feel an operation reaction force. In addition, since various forces may be applied to the moving member by detecting the position to which the moving member is moved, various operation feelings may be provided to an operator.

The moving member of the operating device according to the present invention may be configured to perform a linear motion including moving forward and rearward.

It is preferable that the position sensing unit detect the absolute position of the moving member. The position sensing unit may be disposed on a power-transmission path extending from the motor to the moving member, and the position sensing unit may directly detect the moving member.

The control device may change a frequency of an operation reaction force that acts on the moving member by changing a rotational speed of the motor in accordance with an output signal from the position sensing unit.

In addition, the control device may change an amplitude of the operation reaction force that acts on the moving member by changing a rotation amount of the motor in accordance with an output signal from the position sensing unit.

Furthermore, the control device may change a load of the operation reaction force that acts on the moving member by changing a torque of the motor in accordance with an output signal from the position sensing unit.

An operating device according to the present invention can apply an operation reaction force to a finger that is operating an operating portion because a force is applied by a motor to a moving member, which is caused to move as a result of the operating portion being operated. In addition, since the motor is controlled by detecting the position of the moving member, which reciprocates, various operation feelings can be provided to an operator from the moving member.

DESCRIPTION OF THE PREFERRED EMBODIMENTS

Operating devices according to first to third embodiments of the present invention will be described in detail below with reference to the drawings. FIG. 1 to FIG. 6 illustrate the case where the operating device according to the first embodiment is installed in a gun-shaped controller for a shooting video game. However, as will be described later, the operating devices according to the first to third embodiments of the present invention can be installed in various controllers other than the gun-shaped controller and in various apparatuses other than a video game apparatus.

Figure 1:
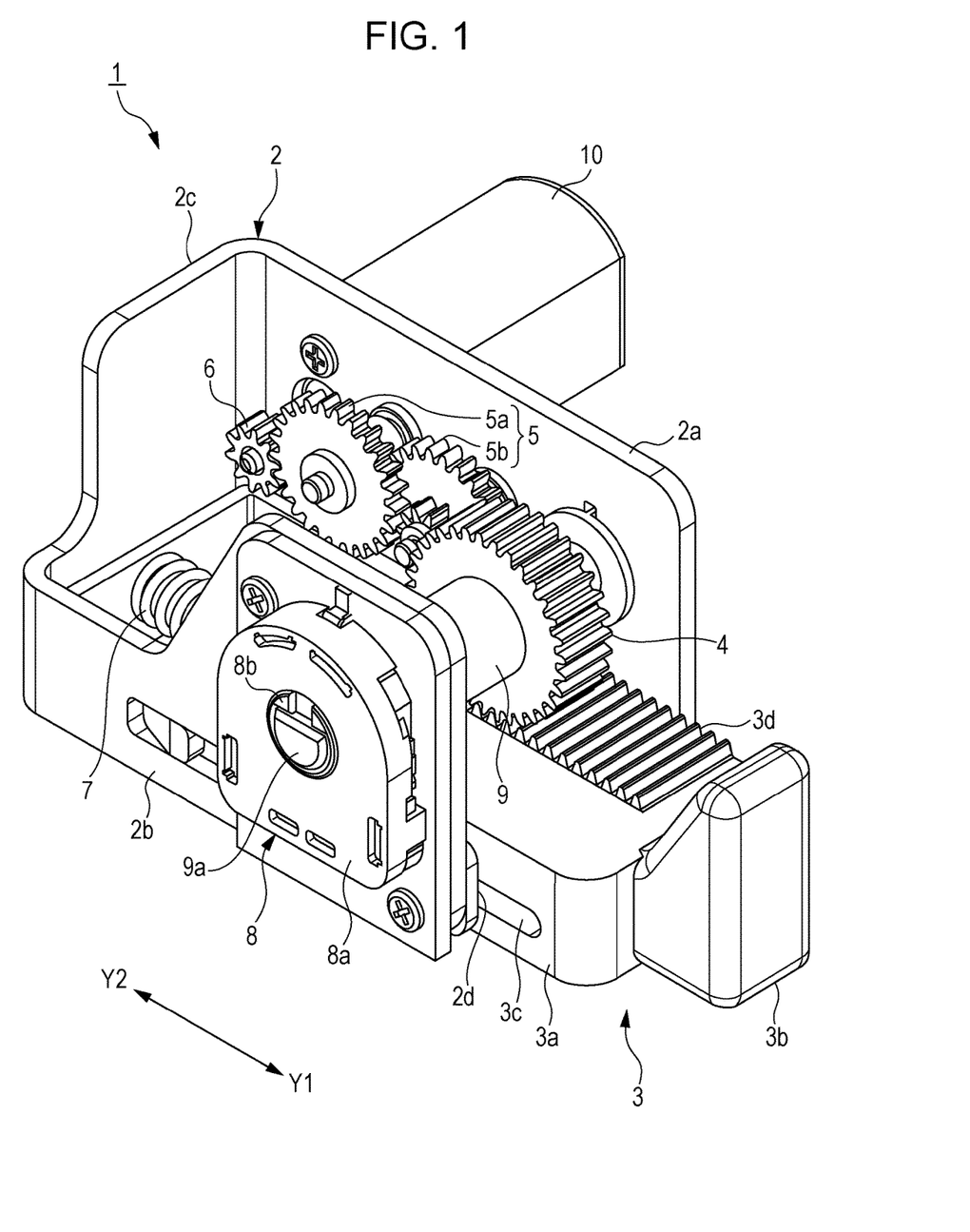
FIG. 1 is a perspective view illustrating the overall configuration of an operating device according to a first embodiment of the present invention.

An operating device 1 illustrated in FIG. 1 includes a main-body frame 2, a moving member 3 that is supported on the main-body frame 2 so as to be capable of being freely slide, and a motor 10 that is supported on the main-body frame 2 and that applies a force for moving forward and a force for moving rearward to the moving member 3.

The main-body frame 2 is formed of a metal plate and is bent so as to have a U shape. The main-body frame 2 includes side-plate portions 2a and 2b, which are facing each other, and a rear-plate portion 2c. The moving member 3 is made of a synthetic-resin material or a lightweight-metal material and includes a main-body portion 3a and an operating portion 3b that is formed at an end of the main-body portion 3a. A hand or a finger is brought into direct contact with the operating portion 3b. The operating portion 3b of the moving member 3 projects forward from an opening of the main-body frame 2. Guiding protrusions 2d and 2d are each provided on the inner side of a corresponding one of the side-plate portions 2a and 2b of the main-body frame 2, and guiding grooves 3c and 3c are formed in the two side surfaces of the main-body portion 3a. The guiding protrusions 2d and 2d are received in the guiding grooves 3c and 3c, and as a result of the guiding grooves 3c and 3c sliding over the corresponding guiding protrusions 2d and 2d, the moving member 3 can reciprocate forward (in the Y1 direction) and rearward (in the Y2 direction) along a linear path parallel to the side-plate portions 2a and 2b.

A pinion shaft 9 is rotatably supported by the side-plate portions 2a and 2b of the main-body frame 2, and a pinion gear 4 is fixed to the pinion shaft 9 so as to be capable of rotating together with the pinion shaft 9. A rack 3d is integrally formed with the top surface of the main-body portion 3a, and a row of teeth of the rack 3d extends in a front-rear direction (Y1 to Y2 direction). The pinion gear 4 is constantly engaged with the rack 3d.

The motor 10 is fixed to the side-plate portion 2a, and an output gear 6 is fixed to an output shaft of the motor 10. A reduction gear train 5 is provided on the inner side of the side-plate portion 2a. Each of reduction gears 5a and 5b, which are included in the reduction gear train 5, includes a larger-diameter gear and a smaller-diameter gear. The larger-diameter gear and the smaller-diameter gear are integrally formed with each other and are each rotatably supported by a gear shaft, which is fixed to the side-plate portion 2a. The output gear 6 engages with the larger-diameter gear of the reduction gear 5a. The smaller-diameter gear of the reduction gear 5a engages with the larger-diameter gear of the reduction gear 5b. The smaller-diameter gear of the reduction gear 5b engages with the pinion gear 4. As a result, the rotation of the motor 10 is decelerated and transferred to the pinion gear 4.

Note that it is not necessary for the moving member 3 to perform a linear motion as long as the moving member 3 may move forward and rearward. For example, the moving member 3 may move forward and rearward along a curved path.

Figure 2:
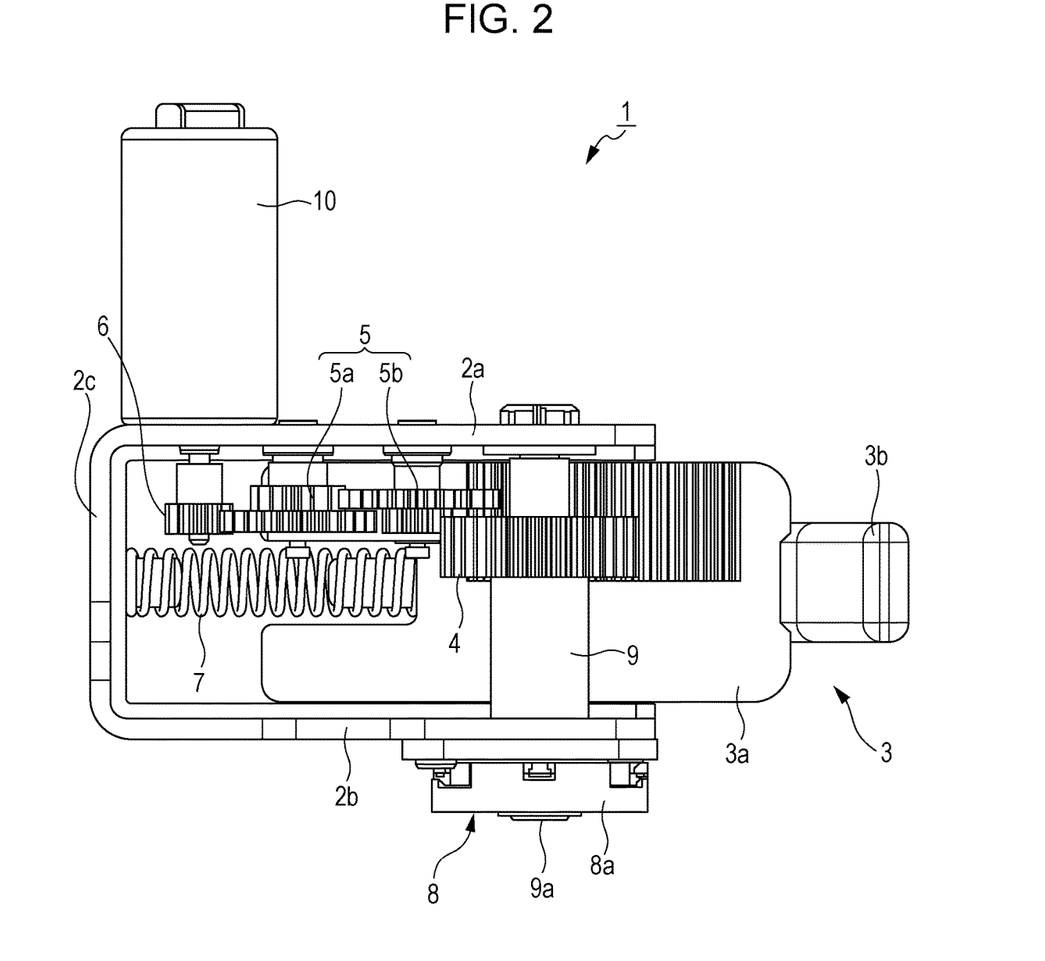
FIG. 2 is a plan view of the operating device, which is illustrated in FIG. 1, illustrating a state where an operating portion and a moving member have moved forward.

As illustrated in FIG. 1 and FIG. 2, a compression-coil spring 7 is provided between the rear-plate portion 2c of the main-body frame 2 and the rear end portion of the moving member 3. An urging force of the compression-coil spring 7 reduces the backlash in a portion where the rack 3d and the pinion gear 4 engage with each other and the backlash in portions where the gears of the reduction gear train 5 engage with one another.

As illustrated in FIG. 1, a position sensing unit 8 is provided on the outside of the side-plate portion 2b of the main-body frame 2. The position sensing unit 8 includes a sensing case 8a, which is fixed to the side-plate portion 2b, a stator portion, which is fixed to the sensing case 8a, and a rotor portion 8b, which rotates within the sensing case 8a. An end portion 9a of the pinion shaft 9 laterally projects from a bearing portion, which is formed in the side-plate portion 2b, and is fitted to the rotor portion 8b. Accordingly, the rotor portion 8b rotates together with the pinion gear 4 and the pinion shaft 9.

The position sensing unit 8 is a magnetic-sensing type encoder, and a rotary magnet is fixed to the rotor portion 8b. A magnetic sensing element, such as a GMR (giant magnetoresistive) element, is provided in the stator portion, and the rotation angle of the rotor portion 8b is detected by the magnetic sensing element. Note that the position sensing unit 8 may be an encoder that uses variations in resistance or an optical encoder.

In the first embodiment illustrated in FIG. 1, although the position sensing unit 8 may be disposed on a power-transmission path extending from the output shaft of the motor 10 to the rack 3d, a position sensing unit that uses a linear sensing method may be disposed between the moving member 3 and the main-body frame 2.

It is preferable that the position sensing unit 8 be able to output different values in the entire stroke of moving forward and rearward of the moving member 3 and be able to detect the absolute position of the moving member 3. As a result, the position at which the moving member 3 is stationary in the front-rear direction when the operating device 1 is switched off and then energized can be determined.

However, an encoder included in the motor 10 or the like may be used as the position sensing unit 8 in such a manner that only a position to which the moving member 3 has moved relative to an initial position of the moving member 3 the moving member 3 may be detected. In this case, when the operating device 1 is switched off and then energized, so-called calibration processing is performed. In the calibration processing, control is started after the moving member 3 has been moved to a reference position in the direction in which the moving member 3 moves forward or to a reference position in the direction in which the moving member 3 moves rearward.

Figure 4:
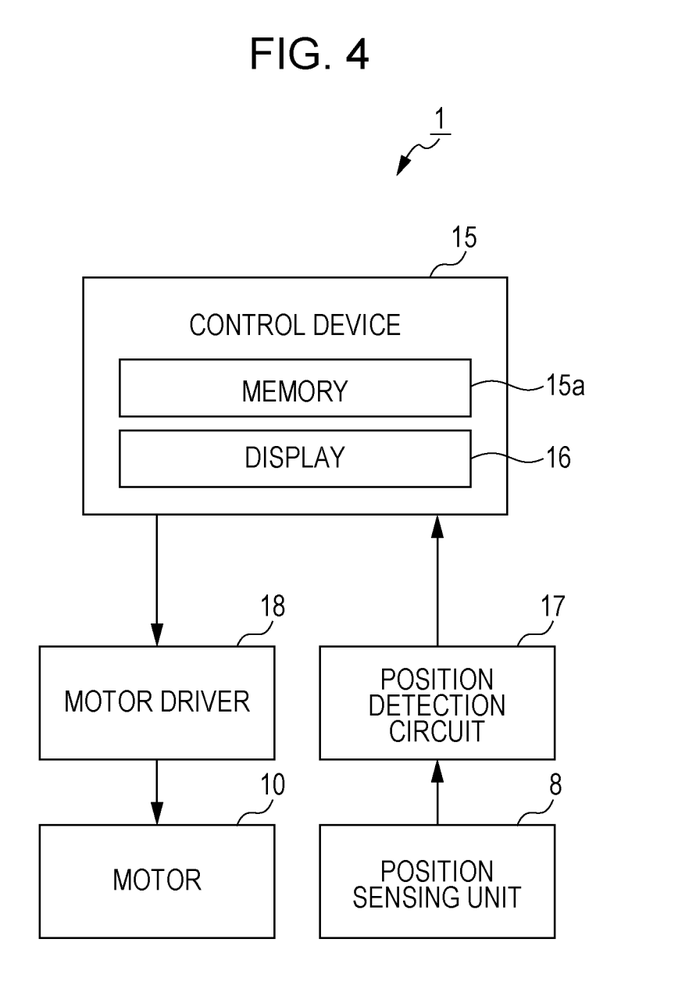
FIG. 4 is a block diagram illustrating the configuration of a control device that causes the operating device illustrated in FIG. 1 to operate.

As illustrated in FIG. 4, the operating device 1 includes a control device 15.

The control device 15 is in charge of a shooting video game and is incorporated in a main body of a game machine, a personal computer, a versatile information processing apparatus, or the like. The control device 15 mainly includes a central processing unit (CPU), a memory 15a, and the like. When the shooting video game is played, game software is invoked from the memory 15a, and a game processing operation is performed in accordance with a predetermined program. In addition, the control device 15 is provided with a display 16, such as a color liquid crystal panel, and a speaker.

A detection output detected by the position sensing unit 8 is detected by a position sensing circuit 17 and transmitted to the control device 15. A control signal is transmitted from the control device 15 to a motor driver 18 such that the motor 10 is controlled. The control signal that drives the motor driver 18 is incorporated in a part of the game software.

Operation of the operating device 1 will now be described.

The operating device 1 can move the moving member 3 to an arbitrary position as a result of a control command being issued from the control device 15 to the motor driver 18 such that the motor 10 is activated. For example, the operating device 1 can cause the moving member 3 to move forward in the Y1 direction and to stop at a position illustrated in FIG. 2 and also can cause the moving member 3 to move rearward in the Y2 direction and to stop at a position illustrated in FIG. 3. The initial position of the moving member 3 can be set to any position in accordance with a control flow performed by the control device 15.

Figure 3:
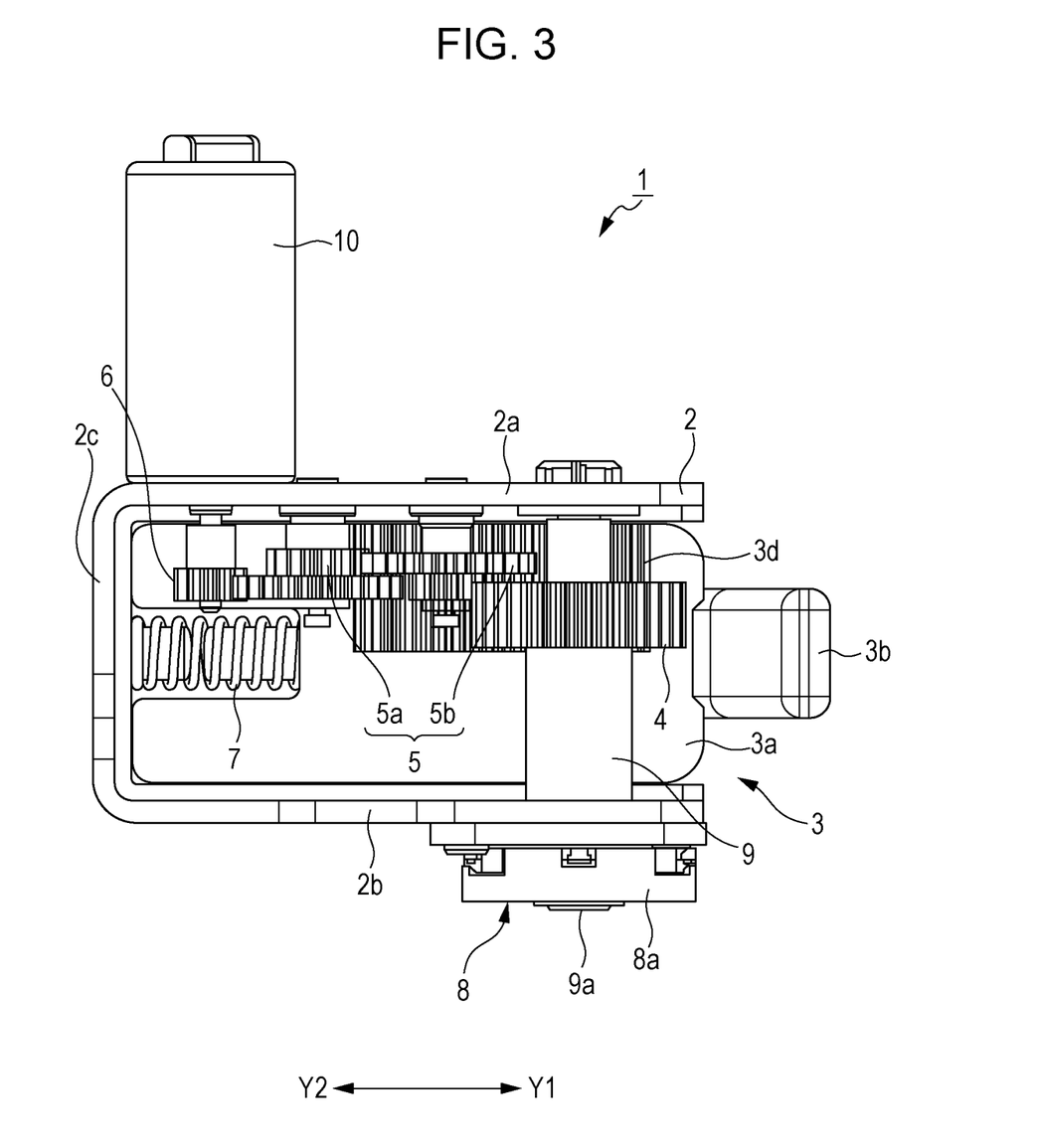
FIG. 3 is a plan view of the operating device, which is illustrated in FIG. 1, illustrating a state where the operating portion and the moving member have moved rearward.

For example, when the operating device 1 is not operating, the moving member 3 may be caused to move rearward so as to be located at the position illustrated in FIG. 3. When the operating device 1 is switched on, the motor 10 may be activated, and the moving member 3 may be caused to move forward to the position illustrated in FIG. 2 such that the position may be set as the initial position of the operating portion 3b.

When the operating portion 3b is pressed rearward (in the Y2 direction) by a finger or a hand while the moving member 3 is set to the initial position illustrated in FIG. 2, the retreating movement of the moving member 3 is detected by the position sensing unit 8. Then, the retreating distance of the moving member 3 is calculated by the position sensing circuit 17, and the control device 15 is informed of the retreating distance. The control device 15 issues a command for applying an operation reaction force to the finger or the hand to the motor driver 18 when the moving member 3 moves rearward, and the motor 10 is caused to operate. The control device 15 decides, on the basis of the flow processed by the control device 15 when the operating portion 3b is pressed and operated, what type of operation reaction force will be applied, and the control device 15 provides, to the motor driver 18, a driving pattern for applying an operation reaction force that is appropriate at the time.

A distance by which the moving member 3 is allowed to move in the Y2 direction when the moving member 3 is pressed by the finger and the hand is set by the driving pattern on the basis of the control flow performed at the time. For example, a movement reaction force can be applied from the motor 10 to the moving member 3 in such a manner that the moving member 3 is caused to move rearward by only 5 mm and not to move rearward any further, or the moving member 3 can be caused to move rearward by 10 mm and not to move rearward any further. The moving member 3 can be controlled as described above by applying a brake force to a rotor of the motor 10 or by applying a moving force in the Y1 direction to the moving member 3 in order to hinder the moving member 3 from moving in the Y2 direction when the moving member 3 has moved to a predetermined position.

Next, a voltage that is applied to the motor 10 is controlled by the driving pattern such that the driving torque of the motor 10 becomes variable, and as a result, a force required for moving the moving member 3 in the Y2 direction can be varied. For example, the force can be set such that the moving member 3 will not move in the Y2 direction unless the operating portion 3b is pressed by a finger or a hand with a large force or such that the moving member 3 can be caused by a relatively small force to move rearward by a predetermined distance, such as 5 mm or 10 mm.

Alternatively, the power torque of the motor 10 may be set to zero at a certain point. When the operating portion 3b is pressed by a finger or a hand in a state where the power torque of the motor 10 is set to zero, the finger or the hand that is pressing the operating portion 3b feels only a deceleration resistance force generated by the reduction gear train 5 and a reaction force generated by the compression-coil spring 7, and the moving member 3 is moved to the terminal position in the Y2 direction.

Alternatively, when the power torque of the motor 10 is set to zero in a state where the moving member 3 is stationary at any position, the moving member 3 may be pressed in the Y1 direction by the elastic force of the compression-coil spring 7, and the operating portion 3b may be set to the initial position illustrated in FIG. 2.

Alternatively, a finger or a hand that is pressing the operating portion 3b can be made to feel a vibration by changing the torque of the motor 10 when the moving member 3 has moved in the Y2 direction by a predetermined distance. In this case, by changing the frequencies at which the motor 10 rotates in the forward and reverse directions or the rotation angle of the motor 10, the frequency or the amplitude of the vibration felt by the finger or the hand can be changed.

A control operation of the operating device 1 while the shooting video game is executed by the control device 15 will now be described in detail.

When the shooting video game is executed, a video game simulation program is read from the memory 15a of the control device 15 and run. After the game has been started, a simulation image of discharge of a gun is displayed on the display 16.

Figure 5:
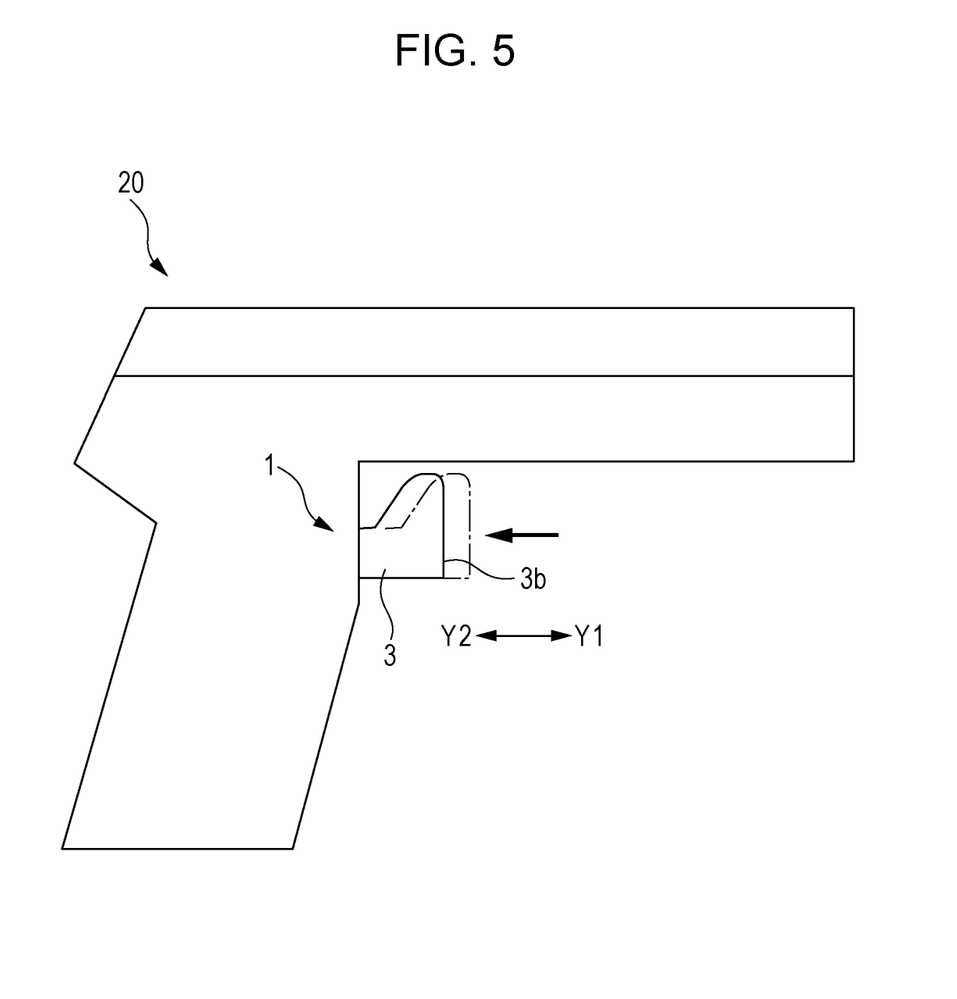
FIG. 5 is a diagram illustrating a schematic configuration in which the operating device according to the first embodiment of the present invention is applied to a gun-shaped controller for a shooting video game.

For example, as a video game controller that is used when the shooting video game is played, a gun-shaped controller 20 illustrated in FIG. 5 is used. In the gun-shaped controller 20, the operating device 1 is accommodated in a trigger portion, and the operating portion 3b, which is integrated with the moving member 3, projects from the controller 20 in the Y1 direction such that the operating portion 3b can be used as a trigger.

Once the game has been started, the motor 10 is activated, and the operating portion 3b moves forward to the initial position, which is indicated by a chain line in FIG. 5. The position from which the operating portion 3b moves forward to the initial position differs according to the contents of the game being processed at the time.

When the operating portion 3b is pressed in the Y2 direction by a finger or a hand of an operator who plays the game, an image of a bullet is fired from an image of a gun in a simulation screen of the shooting video game displayed on the display 16. A firing sound is emitted from the speaker, and a video corresponding to the firing is displayed on the display 16. In this case, the motor 10 is controlled in accordance with the contents of the game, and a reaction force, an impact force, or a vibration force acts on the hand or the finger that is pressing the operating portion 3b.

Since these forces directly act not on the entire gun-shaped controller 20 but on the operating portion 3b, which serves as the trigger, the operator can feel a strong sense of reality while playing the game.

In the shooting video game, an initial menu screen is displayed in a setting screen, and the type of gun to be used in the game can be selected. A gun desired to be used in the game can be selected from, for example, a pistol, a machine gun, a rocket launcher, and the like. Operation patterns, each of which is related to an operation reaction force and the like corresponding to each gun, are stored in the memory 15a. One of the operation patterns is selected and read, and the motor 10 is controlled on the basis of the selected operation pattern.

Consequently, the amount of a load, the amount of play (travel distance), the amount and the frequency of recoil, and the like when the trigger is pressed can be varied depending on the type of gun.

As shown in the following Table 1, in the memory 15a, the types of guns to be used in the game and the operation patterns for driving the motor 10 are associated and mapped with one another. Accordingly, once one of the types of guns to be used in the game has been selected, one of the operation patterns that corresponds to the type of gun is invoked from the memory 15a.

TABLE 1

| Type of Gun | Operation Pattern of Operating Body |
|---|---|
| Pistol | Operation Pattern A |
| Machine Gun | Operation Pattern B |
| Rifle | Operation Pattern C |
| Rocket Launcher | Operation Pattern D |
| Beam Rifle | Operation Pattern E |
| Continuous Beam Gun | Operation Pattern F |
| . | . |
| . | . |
| . | . |

Table 2 and Table 3 each show the control of the motor 10 in one of the operation patterns. Table 2 shows the control of the motor 10 in the operation pattern A (pistol), and Table 3 shows the control of the motor 10 in the operation pattern B (machine gun).

TABLE 2

| | Operation Pattern A (Pistol) | | |
|---|---|---|---|
| | Position of Operating Body | | |
| | P1 to P2 | P2 to P3 | P3 (Discharge) |
| Motor Control | Small Torque | Medium Torque | Single Vibration |

Table 2 shows controlled operations of the motor 10 in the case where a gun selected in the game is a pistol. Regarding the position of the operating portion 3b, a position P1 corresponds to the initial position indicated by the chain line in FIG. 5. A position P2 corresponds to a position to which the operating portion 3b is pressed in the Y2 direction from the initial position P1, and a position P3 corresponds to a position to which the operating portion 3b is further pressed in the Y2 direction.

The stroke of the movement of the operating portion 3b that is pressed from the initial position P1 to the position P2 corresponds to the play movement of a trigger of the gun. The movement of the operating portion 3b that is pressed from the position P2 to the position P3 corresponds to a preparation operation for discharging the gun. When the operating portion 3b reaches the position P3, the gun is discharged. In this game operation, during the period when the operating portion 3b, which serves as the trigger, is moving from the initial position P1 to the position P2, the torque of the motor 10 (torque for pushing back the moving member 3, which is pressed in the Y2 direction, in the Y1 direction) is set to small such that a resistance load applied to the trigger is small. During the period when the operating portion 3b is moving from the position P2 to the position P3, the torque of the motor 10 is increased to a moderate value such that the load applied to the trigger is large. In this case, the control of the motor 10 is performed by varying the voltage applied to the motor 10 in accordance with the position of the moving member 3.

When the operating portion 3b reaches the position P3, the motor 10 is caused to rotate once in the forward direction and rotate once in the reverse direction such that the moving member 3 is caused to vibrate only once in the front-rear direction, and a force corresponding to recoil upon discharging the gun is applied to the operating portion 3b. Note that, in this case, the moving member 3 may be caused to vibrate in a plurality of cycles at a predetermined frequency.

TABLE 3

| | Operation Pattern B (Machine Gun) | | |
|---|---|---|---|
| | Position of Operating Body | | |
| | M1 to M2 | M2 to M3 | M3 (Discharge) |
| Motor Control | Medium Torque | Large Torque | Plural Vibrations |

Table 3 shows controlled operations of the motor 10 in the case where the gun used in the game is a machine gun. In Table 3, a position M1 corresponds to the initial position of the operating portion 3b. A position M2 corresponds to a position to which the operating portion 3b is pressed in the Y2 direction from the initial position M1, and a position M3 corresponds to a position to which the operating portion 3b is further pressed in the Y2 direction.

The movement of the operating portion 3b from the position M1 to the position M2 corresponds to the play movement of the trigger of the gun, and the movement of the operating portion 3b from the position M2 to the position M3 corresponds to preparation for discharging the gun. When the operating portion 3b reaches the position M3, the gun is discharged. During the movement of the operating portion 3b from the position M1 to the position M2, which corresponds to the play movement, the torque of the motor 10 is set to be a moderate value, and during the movement of the operating portion 3b from the position M2 to the position M3, which is the preparation period for discharging the gun, the torque of the motor 10 is set to be large. By applying a load to the trigger, the load being slightly larger than that in the case of the pistol, an operator can feel the weight of the machine gun. By varying a reaction force that acts on the moving member 3 depending on the type of gun, a finger or a hand can directly feel a strong sense of reality while performing a game operation.

As shown in Table 3, when the operating portion 3b reaches the position M3, which is a gun discharging position, the motor 10 is operated so as to repeatedly rotate in the forward and reverse directions, and a vibration is applied to the finger or the hand that is pulling the trigger. The frequency of the vibration and the frequency at which a bullet is ejected from the machine gun match each other. The moving member 3 is caused to vibrate with a slightly large amplitude in the front-rear direction, and a reaction force corresponding to continuous discharges of the machine gun acts on the operating portion 3b.

In addition, a reaction to the operation corresponding to the size and the like of the machine gun can be provided by varying, in accordance with the type of machine gun used in the game, the frequency and the period of the vibration applied to the moving member 3 when the operating portion 3b reaches the position M3 and the torque of the motor 10 when the moving member 3 vibrates.

In the operation pattern D of a rocket launcher shown in Table 1, when the operating portion 3b is located at a gun discharging preparation position, the torque of the motor 10 is set to be large such that the load applied when the trigger is pulled is large. When the operating portion 3b is located at the gun discharging position, the motor 10 is caused to rotate in the forward and reverse directions with a large torque and with a large amplitude, and a large impact is applied to a hand or a finger that is operating the operating portion 3b. In addition, after the rocket launcher has been discharged, reverberation and the like can be provided to the hand or the finger by applying a fine vibration to the moving member 3 at a low-load.

In the operation pattern E of a beam rifle and the operation pattern F of a continuous beam bun, recoil and a vibration to be applied to a finger or a hand that pulls the trigger are set to be slightly smaller than those in the cases of a pistol and a machine gun. In other words, the torque of a reaction force applied by the motor 10 is set to be small, and the amplitude of the vibration is also set to be small.

The game software includes bullet information that indicates the number of bullets loaded in the gun. The bullet information is displayed on the display 16.

The operation reaction force that acts on the operating portion 3b can be varied by using the bullet information. For example, the position of the moving member 3 can be controlled in such a manner that a projection position of the operating portion 3b changes in response to a decrease in the number of available bullets. In addition, when the number of available bullets is zero (when there are no more bullets), the power supplied to the motor 10 may be set to zero instantaneously such that the reaction force in the Y1 direction acting on the moving member 3 is eliminated and that the load applied to the trigger, which is being operated, is suddenly decreased. In this case, when a new bullet is loaded in the gun, the motor 10 may be activated, and the moving member 3 may be moved in the Y1 direction such that the operating portion 3b is caused to return to the initial position indicated by the chain line in FIG. 5.

A processing operation performed by the control device 15 when a simulation of a shooting video game is conducted will now be described with reference to FIG. 6.

Figure 6:
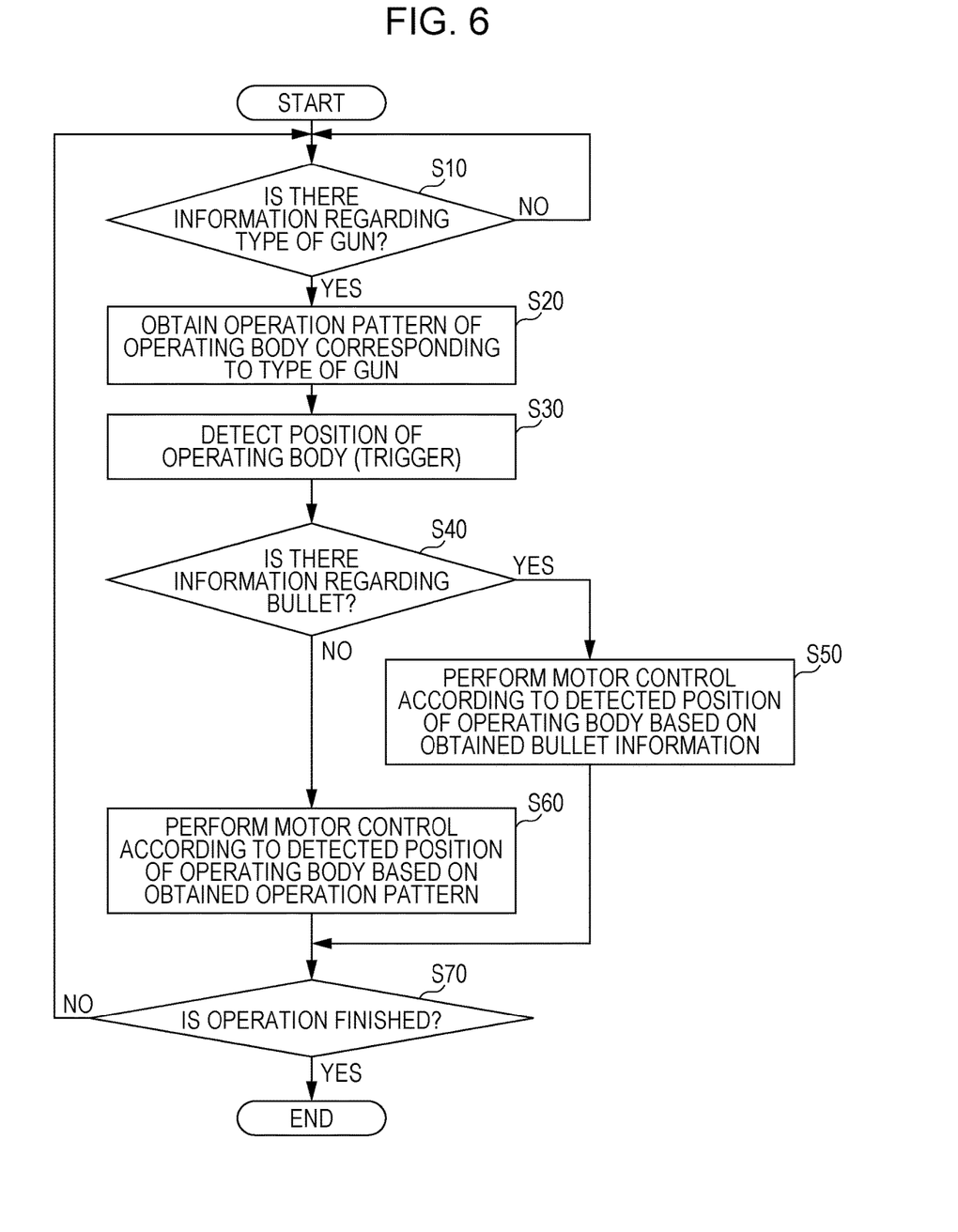
FIG. 6 is a flowchart illustrating a flow of operation control processing performed by the control device in a shooting video game.

In the flowchart illustrated in FIG. 6, the letter "S" denotes a step.

During the period when the shooting video game is executed, by holding the gun-shaped controller 20 illustrated in FIG. 5 with a hand like an actual gun and pulling the trigger, which is the operating portion 3b, by using a finger or the hand while directing the gun-shaped controller 20 toward the display 16, a video of gun firing is displayed on the display 16, and a firing sound is emitted from the speaker.

As illustrated in FIG. 6, in the control device 15, it is determined in step S10 whether there is information regarding the type of gun, and in the case where there is the information regarding the type of gun, an operation pattern of the moving member 3 corresponding to the type of gun is read from the control device 15 in step S20. In the case where there is the information regarding the type of gun, one of data items of the operation patterns shown in Table 1 is selected and read.

In step S30, the position of the trigger, that is, the position of the moving member 3 is detected. Here, it is detected whether the moving member 3 has moved as a result of the operating portion 3b being pressed, and the position to which the moving member 3 has moved is detected. It is confirmed whether there is bullet information (e.g., information indicating that there are no more bullets) in step S40. In the case where there is not bullet information, the motor 10 is controlled in step S60 on the basis of an operation pattern used when the gun is normally operated, and a reaction force and a vibration are applied to the moving member 3.

In the case where it is determined that there is the bullet information (e.g., information indicating that there are no more bullets) in step S40, the position of the operating portion 3b is changed on the basis of the bullet information obtained in step S50, and for example, control, such as discontinuing energization of the motor 10, is performed.

In step S70, it is determined whether the operation has been finished. In the case where it is determined that the operation has not been finished, the process returns to step S10, and in the case where it is determined that the operation has been finished, a series of control operations is terminated.

Figure 7A:
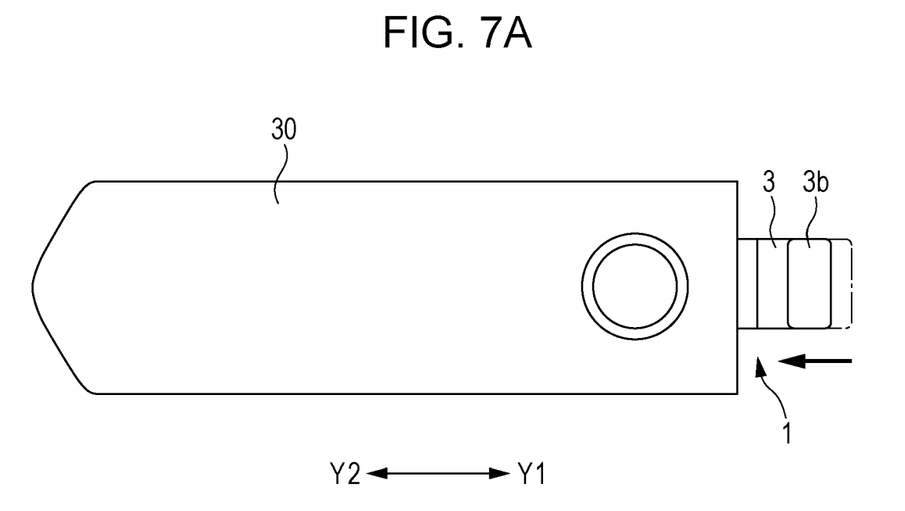
FIGS. 7A and 7B are respectively a plan view and a side view each illustrating a schematic configuration of a video game controller provided with an operating device according to a second embodiment of the present invention.
Figure 7B:
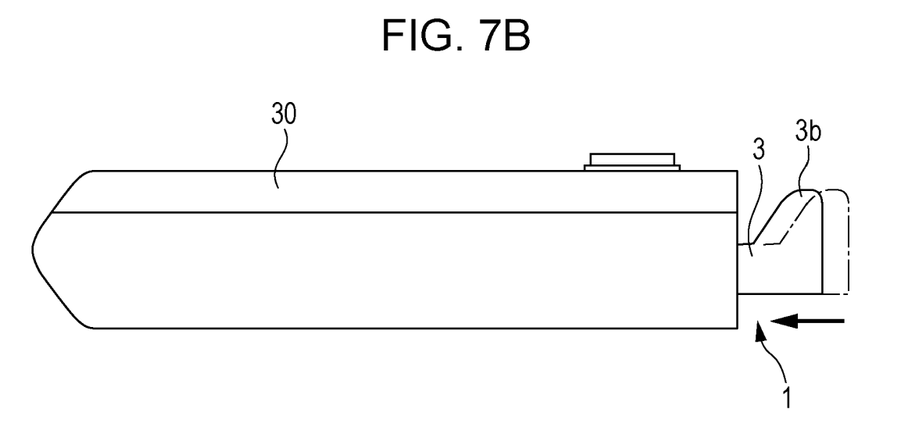

Note that the controller used in the shooting video game is not limited to the gun-shaped controller 20 illustrated in FIG. 5 and may be a stick controller 30 illustrated in FIGS. 7A and 7B. By holding the stick controller 30 with a hand and pressing the operating portion 3b in the Y2 direction by hooking a finger on the trigger, the shooting video game can be operated in a manner similar to that described above.

Figure 8:
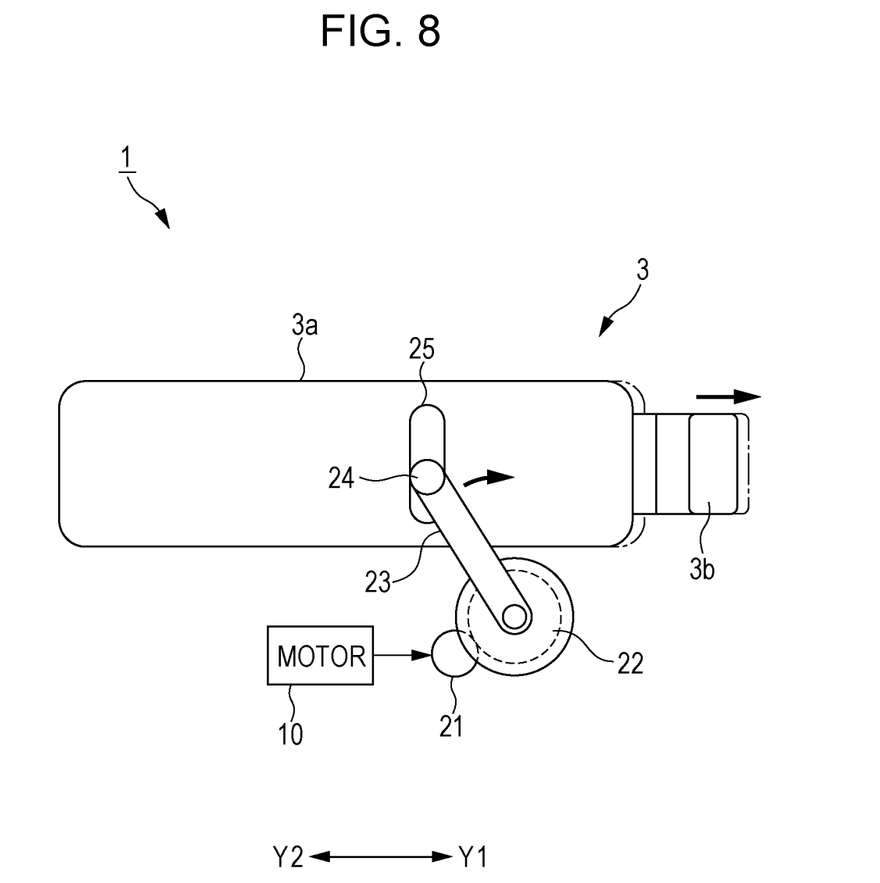
FIG. 8 is a diagram illustrating another structural example of the operating device.

FIG. 8 illustrates the operating device 1 having a mechanism different from that according to the first embodiment. In the mechanism illustrated in FIG. 8, the power of the motor 10 is reduced and transmitted to a link driving gear 22 via a reduction gear 21. A link 23 rotates together with the link driving gear 22, and a driving protrusion 24, which is provided at an end of the link 23, is received in a slide hole 25, which is formed in the moving member 3. In the mechanism, the link 23 rotates in response to rotation of the motor 10, and as a result, the moving member 3 can reciprocate in the Y1 to Y2 direction. When the operating portion 3b included in the moving member 3 is pressed in the Y2 direction, the link 23 and the link driving gear 22 rotate in a counterclockwise direction. The rotation angle and the like of the link driving gear 22 are detected by a movement sensing unit, and the driven state of the motor 10 is varied in accordance with the detected state.

In the first embodiment, when the shooting video game is executed by the control device 15, which is incorporated in a game machine, a personal computer, or a versatile information processing apparatus, driving of the motor 10 is controlled by a feedback from the control device 15. However, a control device may be provided in the controller 20 illustrated in FIG. 5 or in the controller 30 illustrated in FIGS. 7A and 7B, and the motor 10 may be driven by a control operation performed by the control device.

In addition, a game other than the shooting video game may be operated by using a controller that includes the above-described operating device 1. For example, in a car driving video game, an accelerating operation or a braking operation can be performed by pressing the operating portion 3b. Also in this case, a reaction force corresponding to the position to which the operating portion 3b is pressed can be generated by the motor 10.

Figure 9:
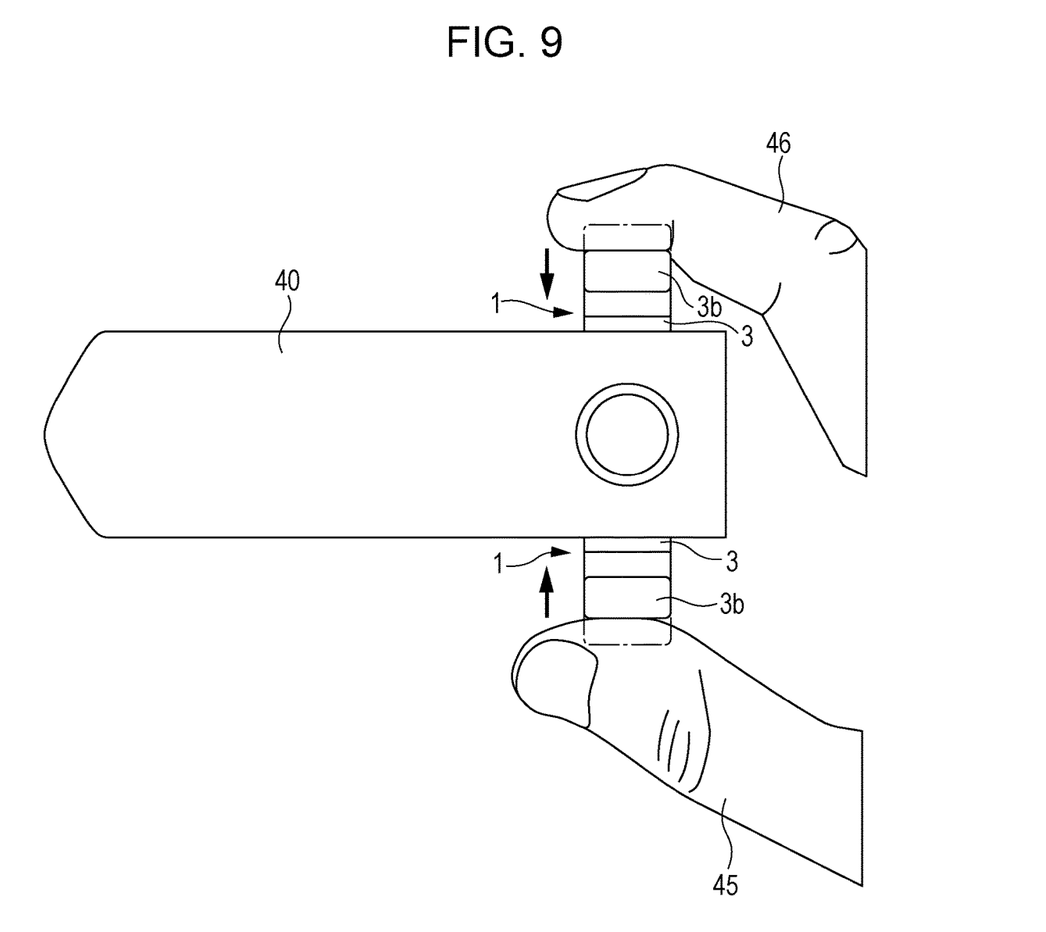
FIG. 9 is a diagram illustrating an example of how to use an operating device according to a third embodiment of the present invention.

In a third embodiment illustrated in FIG. 9, a pair of the operating devices 1 are provided in a controller 40, and two operating portions 3b and 3b are configured to be individually operable.

Figure 10:
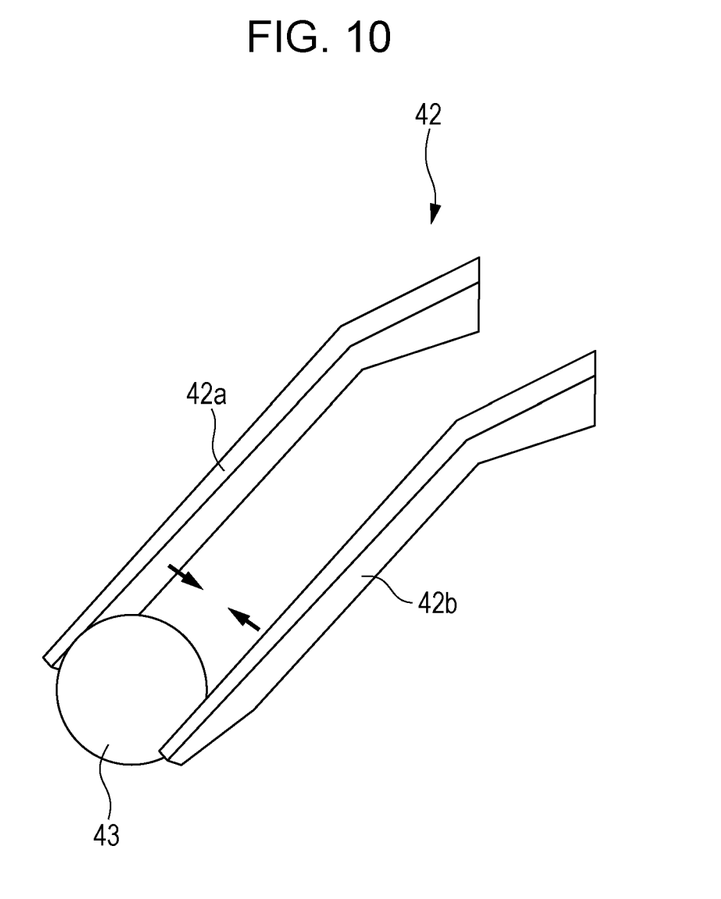
FIG. 10 is diagram illustrating a manipulator that is caused to operate by using the operating device illustrated in FIG. 9.

By using the controller 40, for example, a simulation of operation of a manipulator 42 displayed on the display 16 as illustrated in FIG. 10 can be performed. For example, the operating portions 3b and 3b are individually operated by using two fingers 45 and 46, and as a result, an object 43 can be pinched by two arms 42a and 42a of the manipulator 42 displayed on the display 16.

Also in this case, as a result of reaction forces each corresponding to one of the positions to which the two operating portions 3b and 3b are pressed are applied to the fingers 45 and 46, an operation feeling the same as that in the case where the object 43 is pinched by the arms 42a and 42a can be provided.

Note that the manipulator 42 is not limited to the simulation displayed on the display 16, and an actual manipulator that is capable of performing a mechanical operation can be operated by using the controller 40.

In addition, in the case where five operating devices 1 are provided in a controller, each of the operating portions 3b can be operated by using a corresponding one of the five fingers of one hand. In this case, the feeling of grasping an object by using the five fingers can be provided to an operator. As described above, the range of application of the operating device 1 according to the third embodiment is very wide, and the operating device 1 can be applied to devices other than a manipulator.

Note that, in the above-described embodiments, although the operating portion 3b is formed of a portion of the moving member 3, the moving member 3 and the operating portion 3b may be formed independently of each other, and a force applied to the operating portion 3b when the operating portion 3b is operated may be transmitted to the moving member 3 via a connecting portion.

What is claimed is:

1. An operating device comprising:
a moving member that reciprocates;
an operating portion that applies a moving force to the moving member;
a motor that applies a first force for moving forward and a second force for moving rearward to the moving member;
a position sensor that detects a position to which the moving member is moved; and
a control device that changes a rotational operation of the motor in accordance with an output signal from the position sensing unit, wherein:
the control device changes a frequency of an operation reaction force that acts on the moving member by changing a rotational speed of the motor in accordance with an output signal from the position sensing unit, and
the control device changes an amplitude of the operation reaction force that acts on the moving member by changing a rotation amount of the motor in accordance with an output signal from the position sensing unit.

2. The operating device according to claim 1, wherein the moving member performs a linear motion including moving forward and rearward.

3. The operating device according to claim 1, wherein the position sensing unit detects the absolute position of the moving member.

4. The operating device according to claim 1, wherein the position sensing unit is disposed on a power-transmission path extending from the motor to the moving member.

5. The operating device according to claim 1, wherein the position sensing unit directly detects the moving member.

6. The operating device according to claim 1, wherein the control device changes a load of the operation reaction force that acts on the moving member by changing a torque of the motor in accordance with an output signal from the position sensing unit.

* * * * *